(12) United States Patent
Lebo

(10) Patent No.: US 12,409,625 B2
(45) Date of Patent: Sep. 9, 2025

(54) OUTSOLE AND METHOD OF MAKING THE SAME

(71) Applicant: Columbia Insurance Company, Omaha, NE (US)

(72) Inventor: Jonathan K. Lebo, Lebanon, PA (US)

(73) Assignee: Columbia Insurance Company, Omaha, NE (US)

( * ) Notice: Subject to any disclaimer, the term of this patent is extended or adjusted under 35 U.S.C. 154(b) by 348 days.

(21) Appl. No.: 16/739,175

(22) Filed: Jan. 10, 2020

(65) Prior Publication Data

US 2020/0147910 A1     May 14, 2020

Related U.S. Application Data

(63) Continuation-in-part of application No. 15/454,922, filed on Mar. 9, 2017, now abandoned.

(51) Int. Cl.
| | |
|---|---|
| *A43B 23/08* | (2006.01) |
| *A43B 13/14* | (2006.01) |
| *B29D 35/12* | (2010.01) |
| *B29D 35/14* | (2010.01) |
| *B29L 31/50* | (2006.01) |

(52) U.S. Cl.
CPC ............ *B29D 35/122* (2013.01); *A43B 13/14* (2013.01); *A43B 23/087* (2013.01); *B29D 35/128* (2013.01); *B29D 35/142* (2013.01); *B29D 35/148* (2013.01); *B29L 2031/504* (2013.01)

(58) Field of Classification Search
CPC ..... A43B 13/14; A43B 23/087; A43B 23/081; A43B 23/082; A43B 23/083; A43B 23/086; B29D 35/148; B29D 35/128; B29D 35/142; B29L 2031/504

See application file for complete search history.

(56) References Cited

U.S. PATENT DOCUMENTS

| | | | | | |
|---|---|---|---|---|---|
| 4,072,461 | A | * | 2/1978 | Pirk ..................... | A43B 13/20 425/119 |
| 4,778,145 | A | * | 10/1988 | Savori ................. | A43B 1/0054 249/83 |
| 5,946,755 | A | * | 9/1999 | Aoki .................... | B29D 35/082 12/142 RS |
| 6,041,520 | A | * | 3/2000 | Aoki ........................ | A43B 7/32 36/14 |
| 7,234,251 | B2 | * | 6/2007 | Fuerst ................. | A43B 1/0027 36/11.5 |
| 8,361,369 | B1 | * | 1/2013 | Cook ................. | B29D 35/0009 264/244 |
| 8,747,711 | B1 | * | 6/2014 | Hausmann ........... | B29D 35/142 264/45.4 |
| 8,845,939 | B1 | * | 9/2014 | Smicklevich .......... | A43B 7/143 264/46.4 |

(Continued)

*Primary Examiner* — Katharine G Kane
(74) *Attorney, Agent, or Firm* — IP Attorneys Group, LLC

(57) ABSTRACT

The present invention relates to an improved outsole and method for making the same. In many embodiments, the improved outsole includes an integrally connected rigid material within a toe cap. In many embodiments a mold is provided which aids in the production of the improved outsole by pressing a first and second raw material around the rigid material to form the outsole. The improved outsole provides increased flexibility, comfort, and durability to a shoe which uses the outsole, and greatly improves the protection to the wearer of said shoe.

20 Claims, 15 Drawing Sheets

(56) References Cited

U.S. PATENT DOCUMENTS

| | | | | |
|---|---|---|---|---|
| 9,764,521 B2* | 9/2017 | Hansen | ............... | B29D 35/0018 |
| 2003/0066595 A1* | 4/2003 | Chi | ..................... | A43B 9/12 |
| | | | | 156/245 |
| 2003/0182820 A1* | 10/2003 | Fuerst | ................ | B29D 35/0081 |
| | | | | 36/11.5 |
| 2004/0080077 A1* | 4/2004 | Gumringer | .......... | A43B 3/0084 |
| | | | | 264/244 |
| 2006/0175036 A1* | 8/2006 | Guerrero | .............. | B29D 35/122 |
| | | | | 164/137 |
| 2007/0090575 A1* | 4/2007 | Chen | ................... | B29C 37/0032 |
| | | | | 264/511 |
| 2007/0107257 A1* | 5/2007 | Laska | ...................... | A43B 7/12 |
| | | | | 36/4 |
| 2008/0083485 A1* | 4/2008 | Chi | ..................... | B29D 35/065 |
| | | | | 156/245 |
| 2010/0263239 A1* | 10/2010 | Biancucci | .............. | A43B 13/41 |
| | | | | 36/30 R |
| 2010/0323105 A1* | 12/2010 | Hosoe | ................ | B29C 45/14418 |
| | | | | 427/162 |
| 2011/0126424 A1* | 6/2011 | Gobbato | ................ | A43B 13/10 |
| | | | | 36/43 |
| 2011/0252670 A1* | 10/2011 | Smith | ................... | A43B 13/125 |
| | | | | 36/25 R |
| 2013/0126075 A1* | 5/2013 | Jiang | .................... | B29D 35/148 |
| | | | | 156/219 |
| 2015/0210028 A1* | 7/2015 | Hansen | ............... | B29D 35/0027 |
| | | | | 264/244 |
| 2015/0342296 A1* | 12/2015 | Skaja | ................... | A43B 23/026 |
| | | | | 36/83 |
| 2016/0374435 A1* | 12/2016 | Darland | ................ | A43B 13/12 |
| | | | | 12/142 F |
| 2017/0318901 A1* | 11/2017 | Nishi | ...................... | A43B 5/02 |

* cited by examiner

OUTSOLE AND METHOD OF MAKING THE SAME

This application is a continuation-in-part application of U.S. Non-Provisional patent application Ser. No. 15/454,922, filed Mar. 9, 2017 and titled "Improved Outsole and Method of Making the Same." The contents of the above-identified Application are relied upon and incorporated herein by reference in their entirety.

BACKGROUND OF THE INVENTION

The present invention relates to an improved outsole and method for making the same.

Safety footwear is often required in a variety of situations. A primary function of safety footwear, such as safety boots or shoes, is generally to protect the foot against impacts, falling items, electrical shock, and moisture among other things. Accordingly, some items of footwear may include a toe-cap to protect the toe region of the foot. The toe-cap sometimes defines a volume accommodating the toes of the wearer in the item of footwear so as to protect the toes against the impact from objects falling against the footwear, striking a hard material with the toe region of the shoe, electrical and static shock, and unwanted water damage. In some safety footwear, the toe-cap is within the upper and is therefore under the leather or synthetic material forming the exposed surface of the upper. As the material of the upper is above that of the toe-caps, the material of the upper often rips or is damaged over time as a result of abrasion and impact, thereby exposing the toe-cap material. As they are even used as "hammers" to kick objects, safety boots with toe-caps often wear out prematurely in the toe region. In yet some other footwear, the toe-cap is often secured above the upper via cementing or stitching. Due to this type of construction, there is often an inherent weakness between the upper, toe-cap, and outsole, which often causes poor impact and shock absorption as well as premature wear and tear of the toe-cap. Additionally, this type of manufacturing procedure often requires added time and expense because more steps are involved.

Some toe-caps are cemented or stitched to the outsole prior to the soling process and a portion of such toe-caps is often folded and secured under the edge of the last. None of these constructions have an extension below the edge of the last and form weak junctions between the toe-cap and outsole.

Therefore, there remains a weakness at the junction between the toe-cap and outsole as well as between the midsole and outsole, in the toe-end region of the item of footwear. The toe-end region is subject to abrasion, compression, penetration, and/or intense electrical and static shocks. The weakness is particularly notable in footwear with a cemented or stitched construction between the toe-cap and outsole, as this type of assembly accentuates the separation of the different parts of outsole and of the toe cap.

Thus, there is a need for an efficient method of outsole construction that offers a wearer all the necessary protections from various impacts and shocks while adding shelf-life to the outsole and toe cap via improved construction.

SUMMARY OF THE INVENTION

The present invention relates to an improved outsole and method for making the same. In some embodiments the outsole is prepared using a mold which comprises a bottom lid, a middle lid, a toe cap lid, and a top lid. In some embodiments the middle lid comprises a gap where the toe cap lid is placed. In some embodiments the bottom lid comprises a cavity where a raw material is placed, and in some embodiments the cavity comprises a pattern. Similarly, in some embodiments the middle lid comprises a projection and in some embodiments the projection comprises a pattern. In some embodiments the top lid comprises a cavity which mates with the toe cap lid.

In many embodiments the outsole is formed by pressing or molding a raw material between the lids of the mold. In many embodiments the outsole is made by placing a first saw material on the bottom lid, pressing the first raw material between the middle and bottom lids, placing the toe cap lid within the middle lid gap, placing a second raw material on the toe cap lid, and pressing said second raw material between the toe cap and top lids. In some embodiments the second raw material is rigid, and in others it is flexible. In some embodiments a rigid material is placed between the second raw material and the toe cap lid, and the second raw material encapsulates the rigid material when pressed. In other embodiments the first raw material is pressed up and around the rigid material when pressed.

In some embodiments a temperature is applied to the mold. In some embodiments the mold is first warmed to approximately 155 degrees Celsius before the placement of the first raw material. In some embodiments after closing the top lid the mold is locked and heated to between 165 and 200 degrees Celsius to mold the outsole. In some embodiments this heating step is completed for approximately 800 seconds.

In some embodiments the rigid material is selected from the group consisting of metal, wood, plastics, and combinations thereof. In some embodiments the mold is connected via a hinge and the lids are rotated around the hinge to open and close the mold.

DETAILED DESCRIPTION OF THE INVENTION

Figure 1:
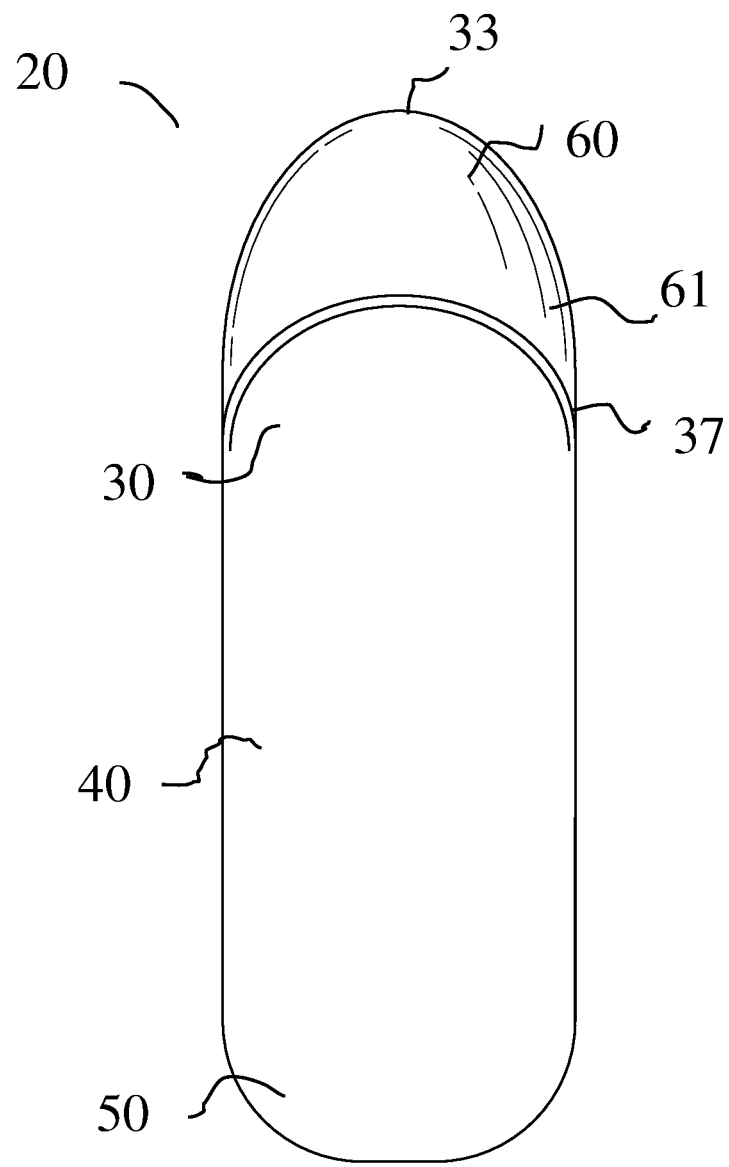
FIG. 1 is a top view of an outsole for a shoe in accordance with this invention.
Figure 2:
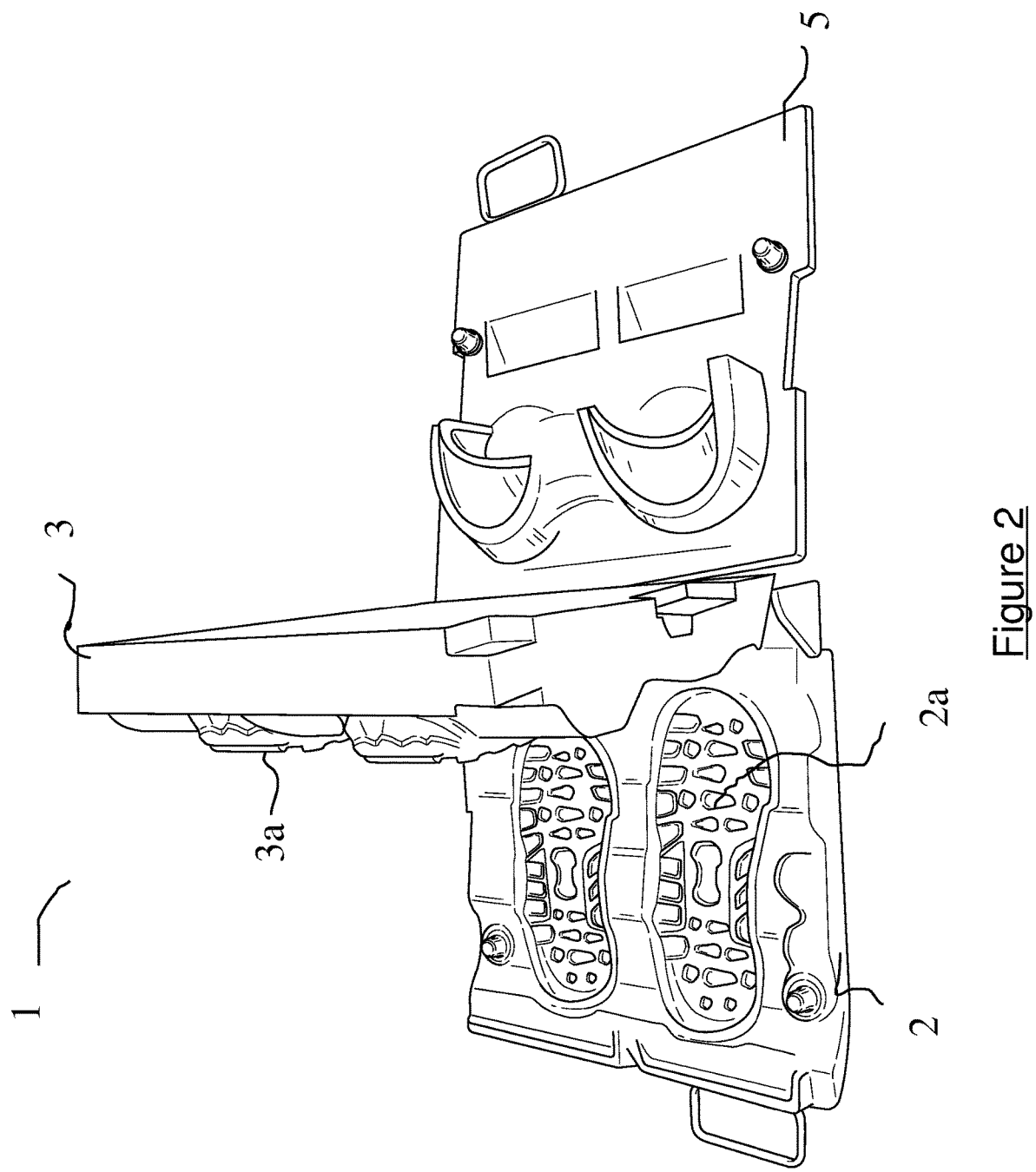
FIG. 2 depicts a mold for forming the outsole according to FIG. 1.
Figure 9:
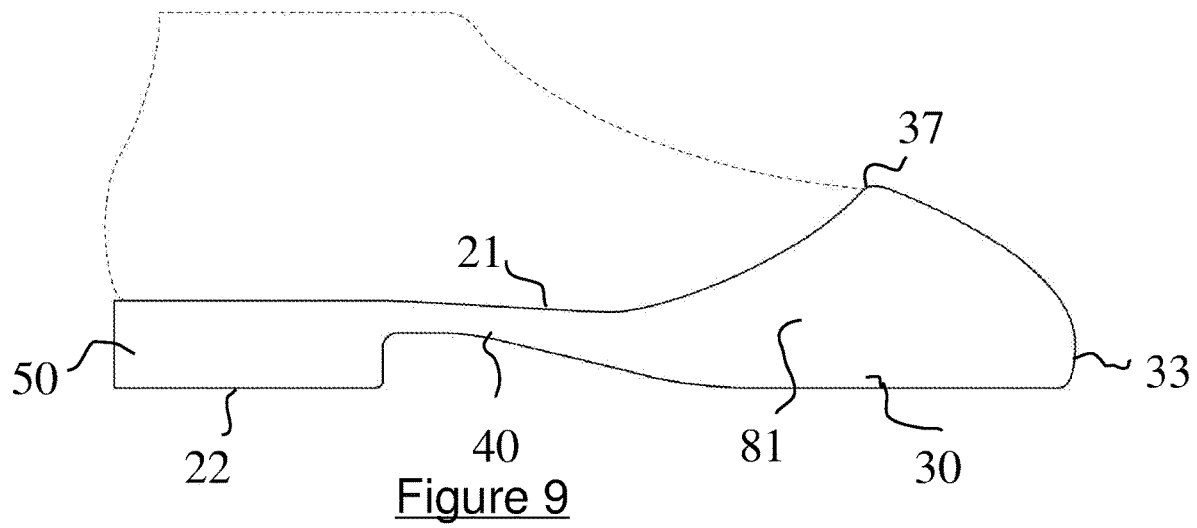
FIG. 9 is a side view of the outsole of FIG. 1.

The present invention related to an improved outsole and method of making the same. As shown in FIGS. 1 and 9, in one embodiment of this invention, an outsole (20) is formed having a bottom surface (22), a top surface (21), a heel region (50), a toe region (30), and a midsole region (40); wherein said toe region (30) further includes a protrusion (33) that extends generally upward in relation to said top surface (21) to produce a generally perpendicular front region (33); and said protrusion (33) further extends generally rearward toward said heel region (50) and generally parallel in relation to said top surface (21) of said outsole (20) to produce a toe cap (60), as shown in FIG. 9.

Figure 14:
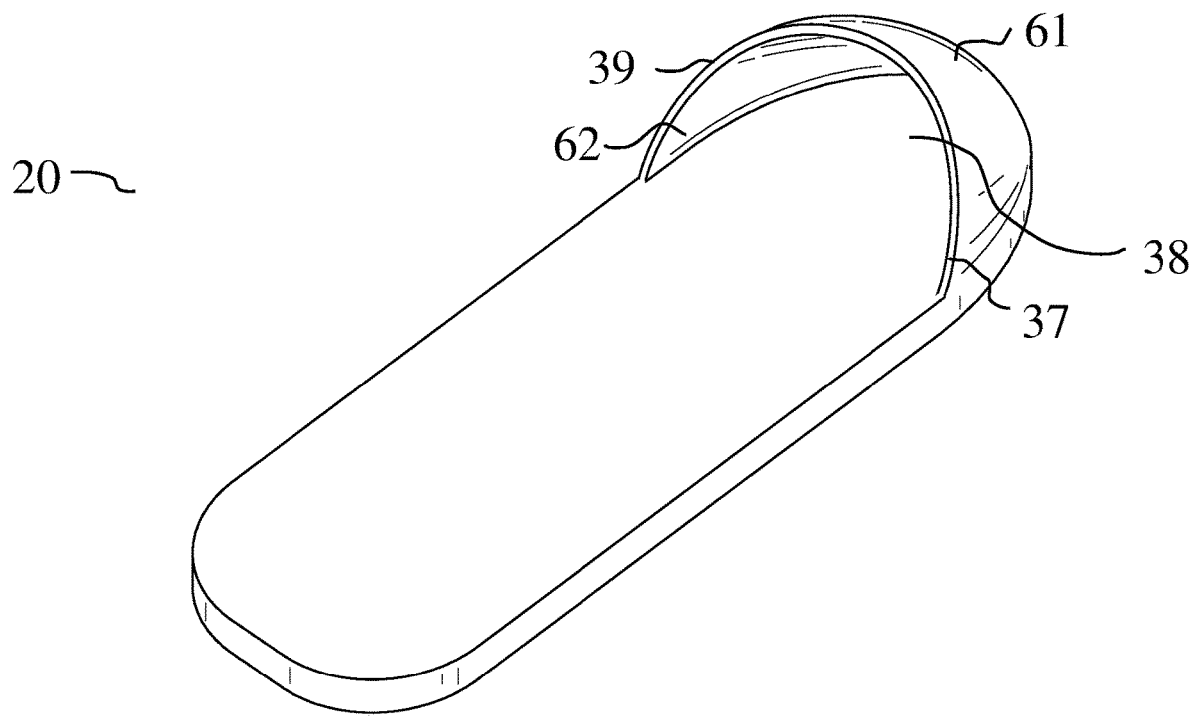
FIG. 14 is a perspective view of the outsole of FIG. 1.
Figure 15:
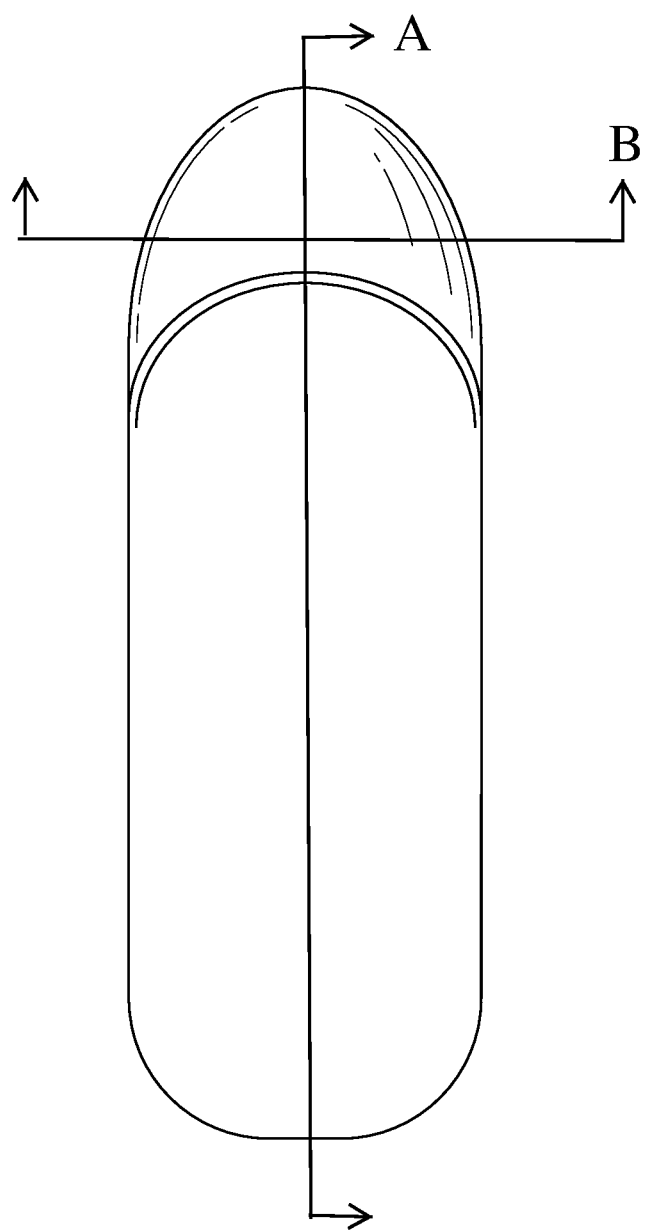
FIG. 15 is a second top view of the outsole of FIG. 1.
Figure 16:
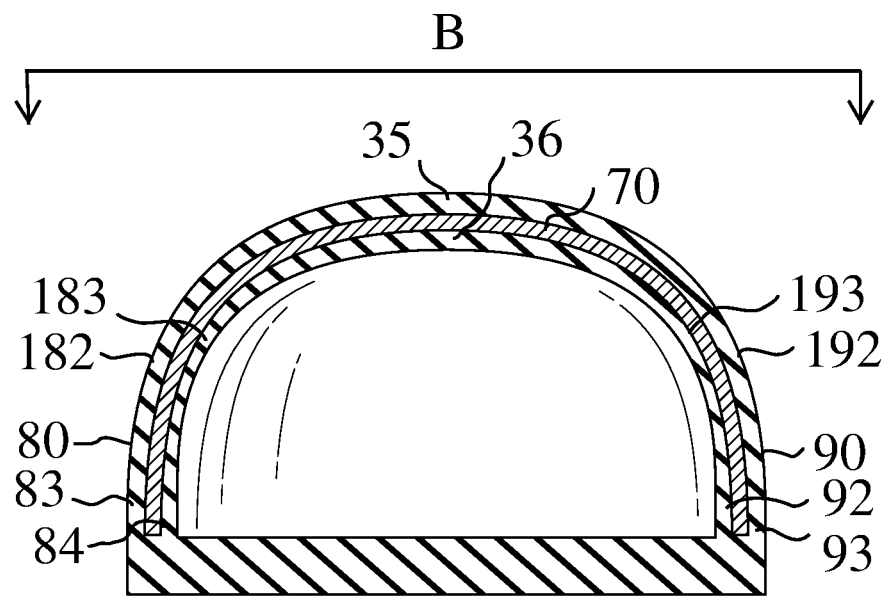
FIG. 16 is a cross-section view of the outsole of FIG. 1.
Figure 17:
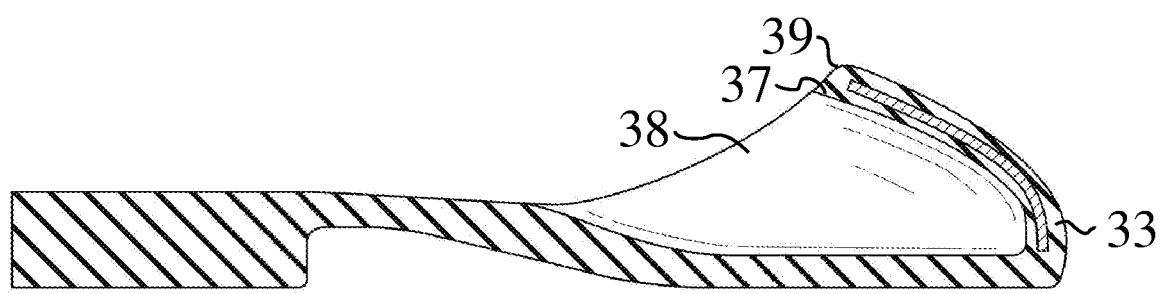
FIG. 17 is a cross-section view of the outsole of FIG. 1.
Figure 18:
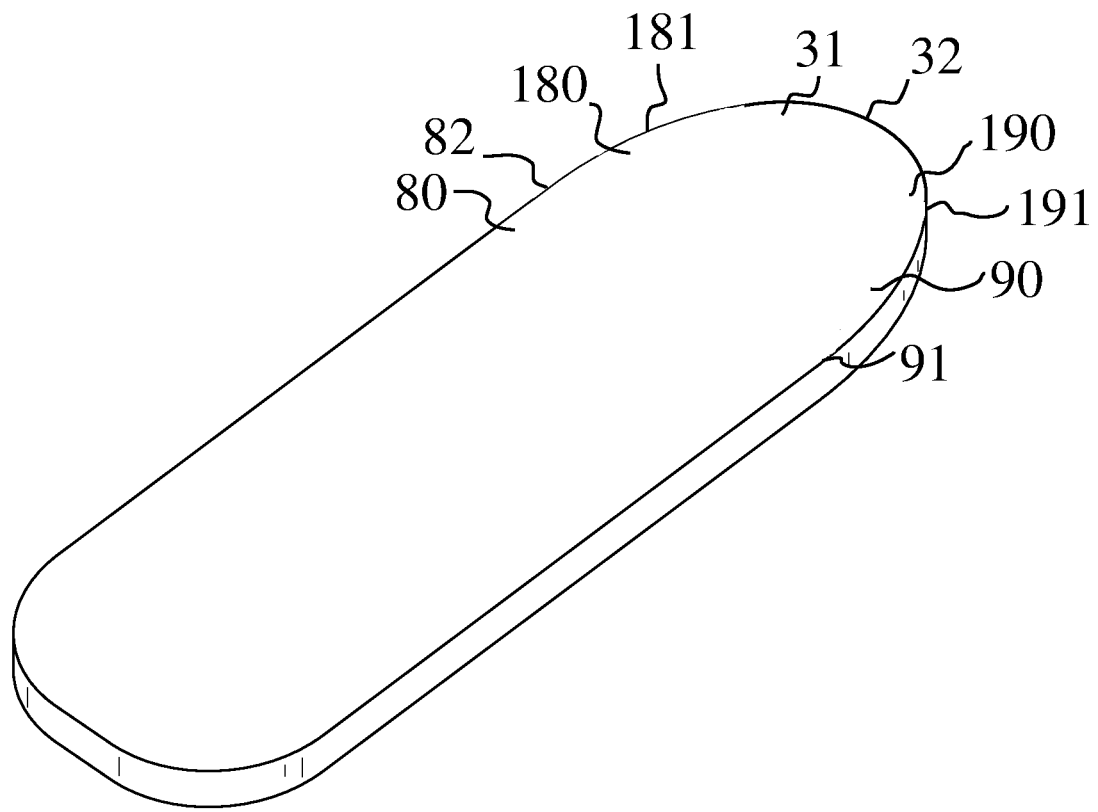
FIG. 18 depicts the outsole of FIG. 1 without a toe cap.

In another embodiment as shown in FIG. 9, the toe cap (60) further includes sidewalls (81). In another embodiment as shown in FIG. 18, the toe region (30) further includes a peripheral edge (32). In another embodiment as shown in FIG. 9, the sidewalls (81) are secured to the peripheral edge (32) of the toe region (30). In another embodiment as shown in FIG. 14, the toe cap further includes an open cavity (38). In another embodiment, the open cavity (38) is defined by an edge (37). In another embodiment as shown in FIG. 1, this edge (37) is rearward facing. In yet another embodiment, a rigid material (70) is integrally connected with the outsole (20). In another embodiment as shown in FIGS. 16-17, the rigid material (70) is encapsulated within the toe cap (60). In another embodiment, the outsole (20) is formed by a first material (10). In another embodiment, the toe cap (60) is formed by a second material. In yet another embodiment as shown in FIGS. 1 and 9, the toe cap (60) is integrally connected with the outsole (20). In some embodiments the outsole (20) and the toe cap (60) are made of the same materials and in others they are different materials.

Figure 10:
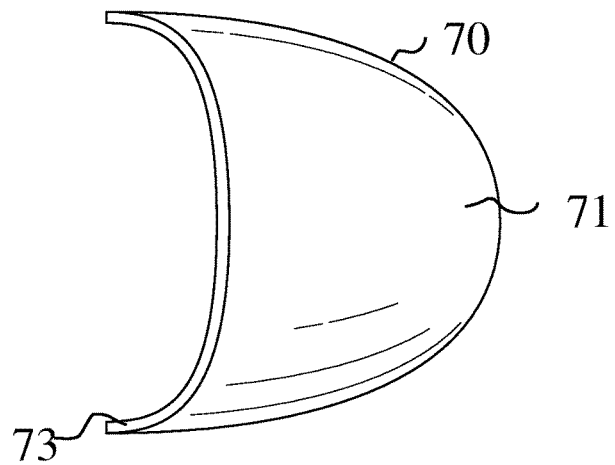
FIG. 10 is a top view of a rigid material for the outsole of FIG. 1.
Figure 11:
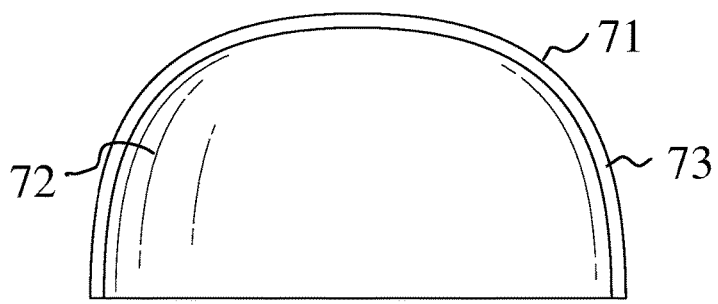
FIG. 11 is a rear view of the rigid material for the outsole of FIG. 1.
Figure 12:
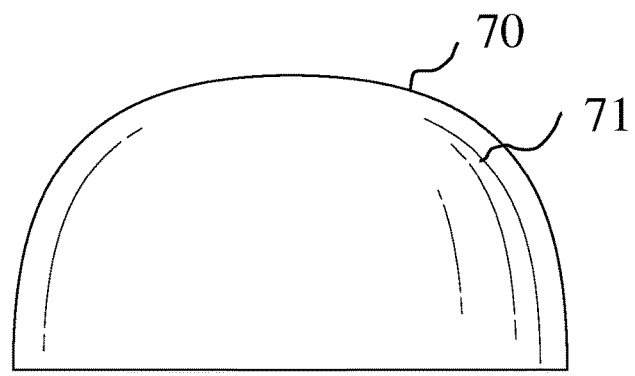
FIG. 12 is a front view of the rigid material for the outsole of FIG. 1.
Figure 13:
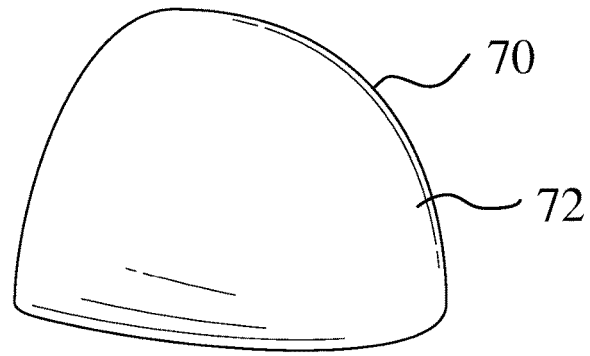
FIG. 13 is a perspective view of the rigid material for the outsole of FIG. 1.

In one embodiment as shown in FIG. 14, the toe cap (60) further consists of a top layer (61) and a bottom layer (62), wherein the top layer (61) is extended over a top surface (71) of a rigid material (70), and the bottom layer (62) is extended over a bottom surface (72) of the rigid material (70). In another embodiment, the top (61) and bottom (62) layers of the toe cap (60) connect to form the rearward facing toe cap edge (37), as shown in FIGS. 14 and 17. In another embodiment as shown in FIG. 10, the rigid material further includes a rearward facing edge (73). In one embodiment as shown in FIG. 17, the top (61) and bottom (62) layers of the toe cap (60) connect adjacent to (39) the rigid material rearward facing edge (73), surrounding the rigid material rearward facing edge (73).

In most embodiments the outsole (20) is made of a water-resistant and flexible material comprising synthetic rubber, natural rubber, foam, plastics, polymers, water-resistant fabrics, and combinations thereof. In some embodiments plastics comprise polyethylene, polypropylene, polyurethane, polyvinylchloride, polytetrafluoroethylene, polyethylene terephthalate, and combinations thereof. In some embodiments the plastics are thermoplastic and in others they are thermoset. In many embodiments the outsole (20) has shock resistant or shock absorbing qualities such that it is absorbs the force of the foot hitting the ground or the toe hitting an obstacle. In many embodiments shock resisting nature of outsole (20) comes by it compressing or flexing under pressure.

In contrast to this, in many embodiments the rigid material (70) is made of a material which is generally inflexible and non-compressing. In many embodiments the rigid material is made of metal, wood, hard plastics, and combinations thereof. These rigid materials beneficially protect the user by avoiding substantial compression when heavy objects or other higher forces come in contact with rigid material (70). Although compressing materials may be able to absorb similar forces, rigid material (70) importantly maintains its shape under pressure which protects the user in a way that compressing material would not be able to achieve.

Figure 19:
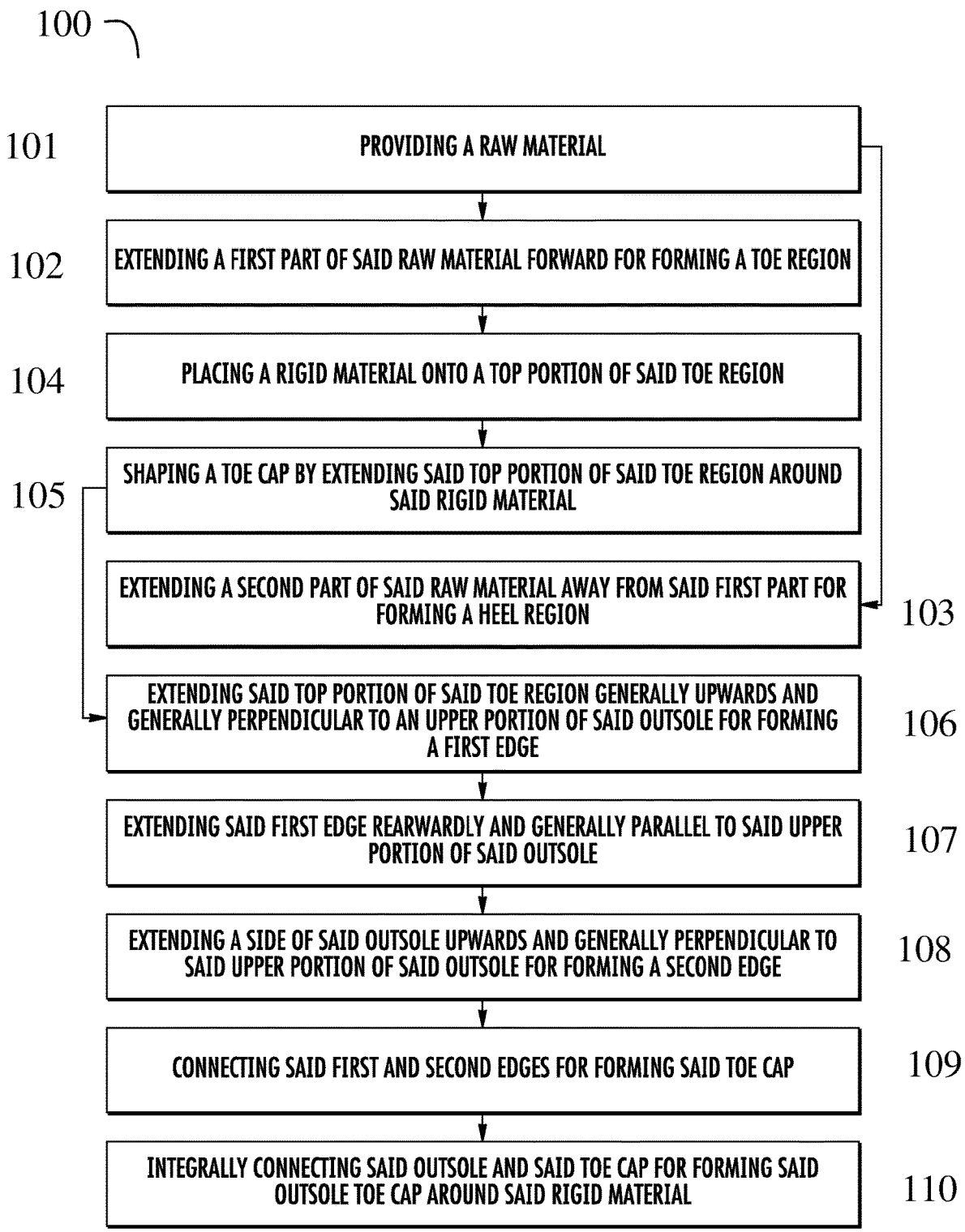
FIG. 19 depicts a method of forming the outsole of FIG. 1.

In one embodiment as shown in FIG. 19, a method (100) for forming an outsole (20), shown in FIG. 1, for a shoe comprises a step (101) of providing a raw material (10) having a first part (10a) and a second part (10b); a step of providing each of the first (10a) and second (10b) parts with each an upper portion (21) and a bottom portion (22); a step (102) of extending the first part (10a) for forming a toe region (30); a step (103) of extending the second part (10b) away from the first part (10a) for forming a heel region (50); a step (104) of placing a rigid material (70) onto a top portion (31) of the toe region (30); and a step (105) of shaping a toe cap (60) by extending the top portion (31) of the toe region (30) around the rigid material (70).

In another embodiment as shown in FIG. 19, the step (105) of shaping the toe cap (60) further comprises the step (106) of extending the top portion (31) of the toe region (30) generally upwards and generally perpendicular to the upper portion (21) of the outsole (20) for forming a first edge (32); a step (107) extending the first edge (32) toward the heel region (50) and generally parallel to the upper portion (21) of the outsole (20); a step (108) of extending a side (80) of the outsole (20) generally upwards and generally perpendicular to the upper portion (21) of the outsole (20) for forming a second edge (82); a step (109) of connecting the first (32) and second (82) edges for forming the toe cap (60) around said rigid material (70); and a step (110) of integrally connecting said toe cap (60) and said outsole (20).

In yet another embodiment, the step (105) of shaping the toe cap (60) further comprises a step (108) of extending a side (80) of the outsole generally upwards and generally perpendicular to the upper portion (21) of the outsole (20) for forming a third edge (181), as shown in FIG. 18; a step (109) of connecting the first (32), second (82), and third (181) edges for forming the toe cap (60) around the rigid material (70); and a step (110) of integrally connecting said toe cap (60) and said outsole (20).

In yet another embodiment, the step (110) of integrally connecting the toe cap (60) with the outsole (20) takes place before the step (109) of connecting the first (32) and second (82) edges. In another embodiment, the step (110) of integrally connecting the toe cap (60) with the outsole (20) takes place before the step of connecting the first (32), second (82), and third (181) edges.

In yet another embodiment, the step (105) of shaping the toe cap (60) further comprises a step (108) of extending a side (80) of the outsole (20) generally upwards and generally perpendicular to the upper portion (21) of the outsole (20) for forming a fourth (191) edge, as shown in FIG. 18; a (109) of connecting the first (32), second (82), third (181), and fourth (191) edges for forming the toe cap (60) around the rigid material (70); and a step (110) of integrally connecting said toe cap (60) and said outsole (20).

Figure 20:
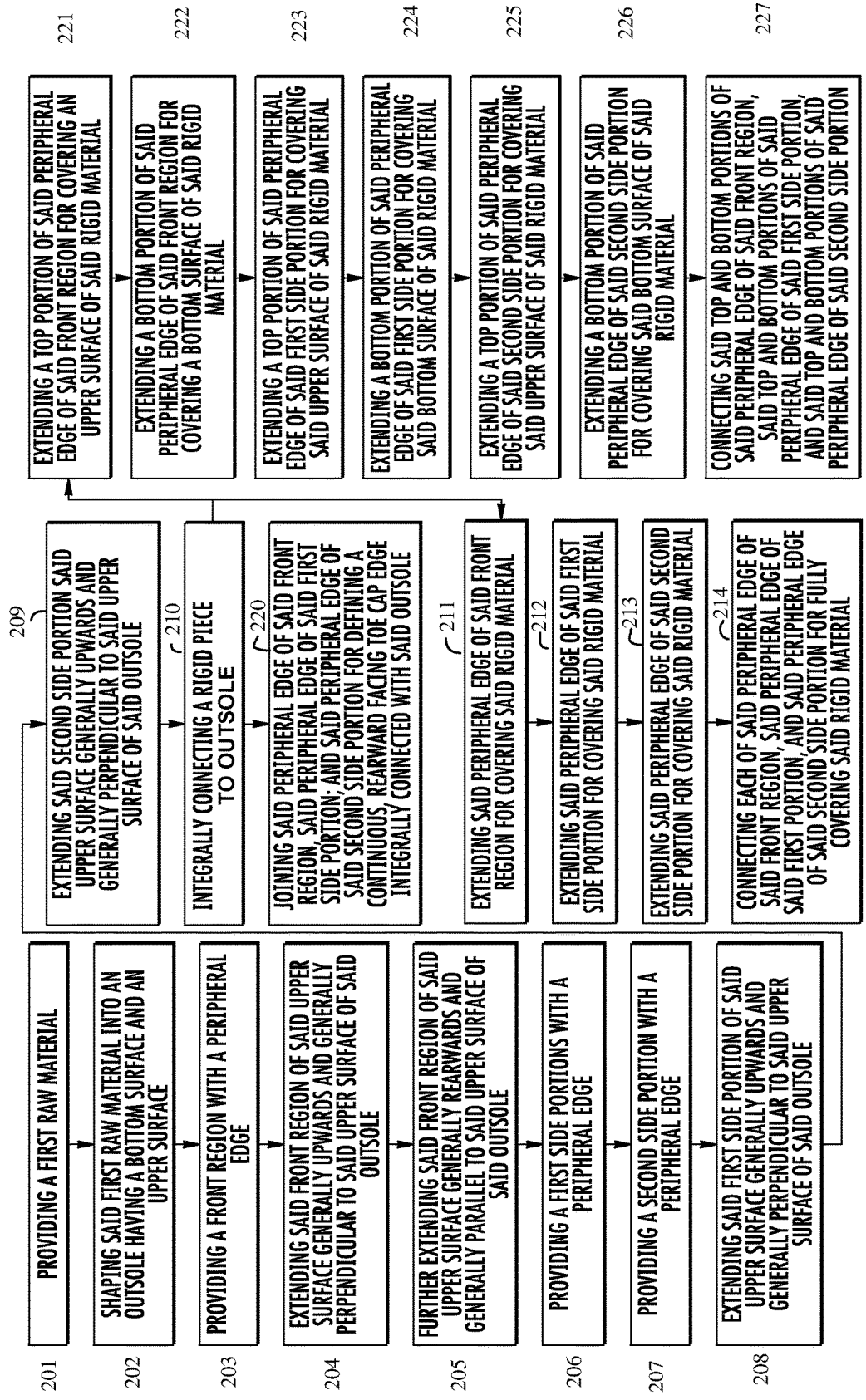
FIG. 20 depicts a method of forming the outsole of FIG. 1.

In one embodiment as shown in FIG. 20, a method (200) for forming an outsole (20) for a shoe comprises the step (201) of providing a first raw material (10); a step (202) of shaping said raw material (10) into an outsole (20) having a bottom surface (22) and an upper surface (21); a step (103) of providing a front region (30) of the outsole (20) with a peripheral edge (32); a step (204) of extending the front region (30) of the upper surface (21) generally upwards and generally perpendicular to said upper surface (21); a step (205) of further extending said front region (30) generally rearwards and generally parallel to the upper surface (21); a step (206) of providing a first side portion (80) of the outsole (20) with a peripheral edge (82); a step (207) of providing a second side portion (90) of the outsole (20) with a peripheral edge (91); a step (208) extending the first side portion (80) generally upwards and generally perpendicular to the upper surface (21); a step (209) of extending the second side portion (90) upwards and generally perpendicular to the upper surface (21); and a step (210) of integrally connecting a rigid piece (70) to outsole (20).

In one embodiment as shown in FIG. 20, the step (210) of integrally connecting the rigid piece (70) further comprises a step (220) of joining the peripheral edge of the front region (32), the peripheral edge of the first side portion (82), and the peripheral edge of the second side portion (91) for forming toe cap (60). In another embodiment, the step (220) of joining the peripheral edge (32) of the front region (30), the peripheral edge (82) of first side portion (80, and peripheral edge (91) of second side portion (90) further includes a step of forming a continuous, rearward facing toe cap edge (37) integrally connected with the outsole (20).

In yet another embodiment as shown in FIG. 20, the step (210) of integrally connecting the rigid piece (70) to the outsole (20) further comprises the step (211) of extending the peripheral edge (32) of the front region (30) for covering the rigid material (70); a step (212) of extending the peripheral edge (82) of the first side portion (80) for covering the rigid material (70); a step (213) of extending the peripheral edge (91) of the second side portion (90) for covering the rigid material (70); and a step (214) of connecting the peripheral edges (32, 82, 91) of each the front region (30), first side portion (80), and second side portion (90) for fully enveloping the rigid material (70) in a toe cap (60).

In another embodiment as shown in FIG. 20, the step (210) of integrally connecting the rigid material (70) with the outsole (20) comprises a step of providing the peripheral edge (32) of the front region (30) with a top portion (35) and a bottom portion (36); a step (221) of extending the top portion (35) of the front region peripheral edge (32) for covering an upper surface (71) of the rigid material (70); a step (222) of extending the bottom portion (36) of the front region peripheral edge (32) for covering a bottom surface (72) of the rigid material (70); a step providing the peripheral edge (82) of the first side portion (80) with a top portion (83) and a bottom portion (84); a step (223) extending the top portion (83) of the peripheral edge (82) of the first side portion (80) for covering the rigid material upper surface (71); a step (224) extending the bottom portion (84) of the peripheral edge (82) of the first side portion (80) for covering the rigid material bottom surface (72); a step of providing the peripheral edge (91) of the second side portion (90) with a top portion (92) and a bottom portion (93); a step (225) extending the top portion (92) of the peripheral edge (91) of the second side portion (90) for covering the rigid material upper surface (71); a step (226) extending the bottom portion (93) of the peripheral edge (91) of the second side portion (90) for covering the rigid material bottom surface (72); and a step (227) connecting said top (35) and bottom (36) portions of said peripheral edge (32) of said front region (30), said top (83) and bottom (84) portions of said peripheral edge (82) of said first side portion (80), and said top (92) and bottom (93) portions of said peripheral edge (91) of said second side portion (90) for forming a toe cap (60) integrally connected with the rigid material (70) and the outsole (20).

In one embodiment as shown in FIGS. 16 and 18, the method (200) for forming an outsole (20) further includes providing a third side portion (180); providing the third side portion (180) with a peripheral edge (181) having a top portion (182) and a bottom portion (183); extending the top portion (182) of the third side portion peripheral edge (181) for covering the rigid material upper surface (71); extending the bottom portion (183) of the third side peripheral edge for covering the rigid material bottom surface (72); and connecting said top (35) and bottom (36) portions of said peripheral edge (32) of said front region (30), said top (83) and bottom (84) portions of said peripheral edge (82) of said first side portion (80), said top (92) and bottom (923) portions of said peripheral edge (91) of said second side portion (90), and said top (182) and bottom (183) portions of said peripheral edge (181) of said third side portion (180) for forming a toe cap (60) integrally connected with the rigid material (70) and the outsole (20).

In one embodiment as shown in FIGS. 16 and 18, the method (200) for forming an outsole (20) further includes providing a fourth side portion (190); providing the fourth side portion (190) with a peripheral edge (191) having a top portion (192) and a bottom portion (193); extending the top portion (192) of the fourth side portion peripheral edge (191) for covering the rigid material upper surface (71); extending the bottom portion (193) of the fourth side peripheral edge (191) for covering the rigid material bottom surface (72); and connecting said top (35) and bottom (36) portions of said peripheral edge (32) of said front region (30), said top (83) and bottom (84) portions of said peripheral edge (82) of said first side portion (80), said top (92) and bottom (923) portions of said peripheral edge (91) of said second side portion (90), said top (182) and bottom (183) portions of said peripheral edge (181) of said third side portion (180), and said top (192) and bottom (193) portions of said peripheral edge (191) of said third side portion (190) for forming a toe cap (60) integrally connected with the rigid material (70) and the outsole (20).

Figure 3:
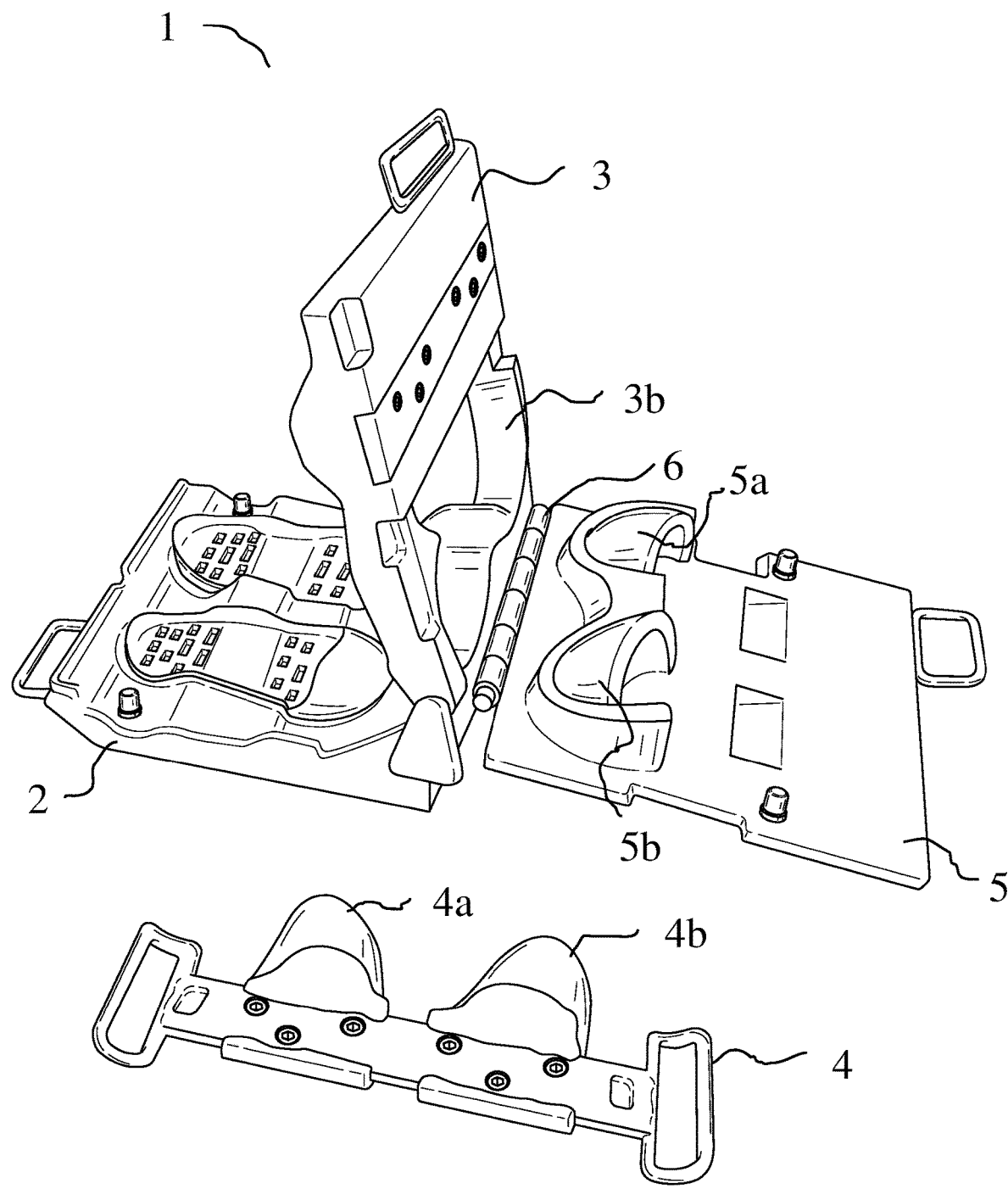
FIG. 3 depicts an open view of the mold for forming the outsole of FIG. 1.
Figure 4:
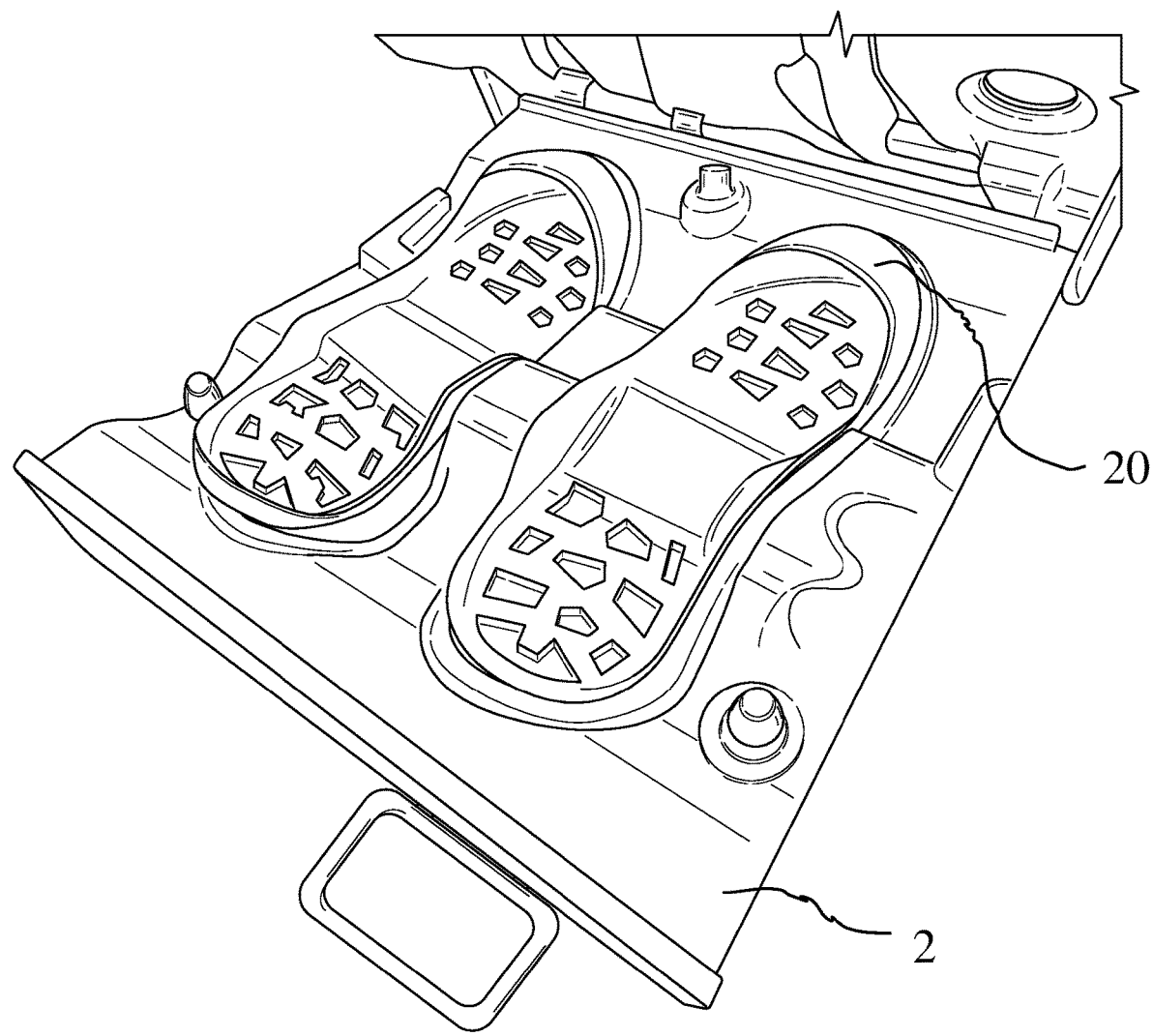
FIG. 4 depicts the bottom lid of the mold for forming the outsole of FIG. 1.
Figure 5:
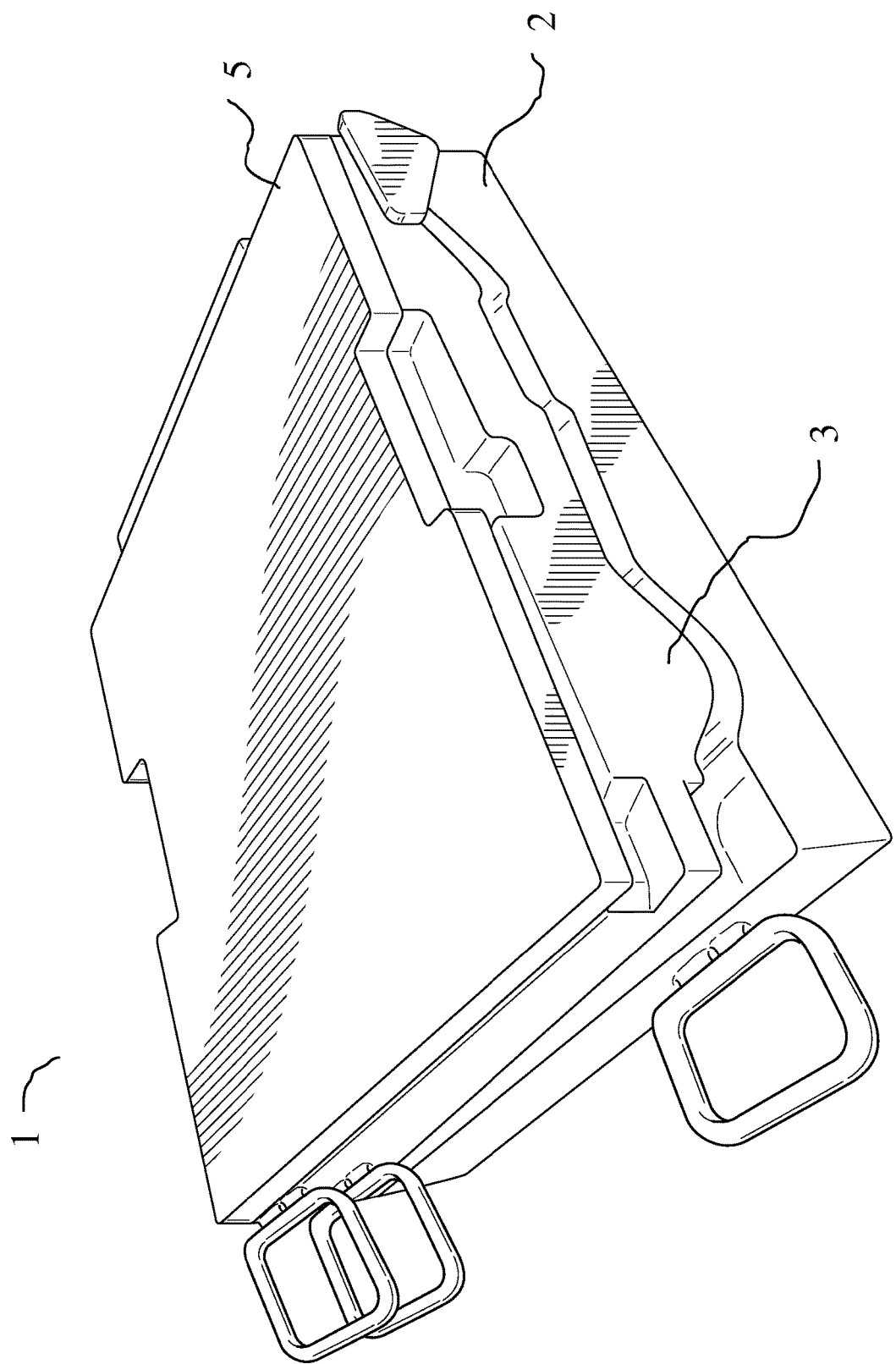
FIG. 5 depicts a closed view of the mold for forming the outsole of FIG. 1.
Figure 6:
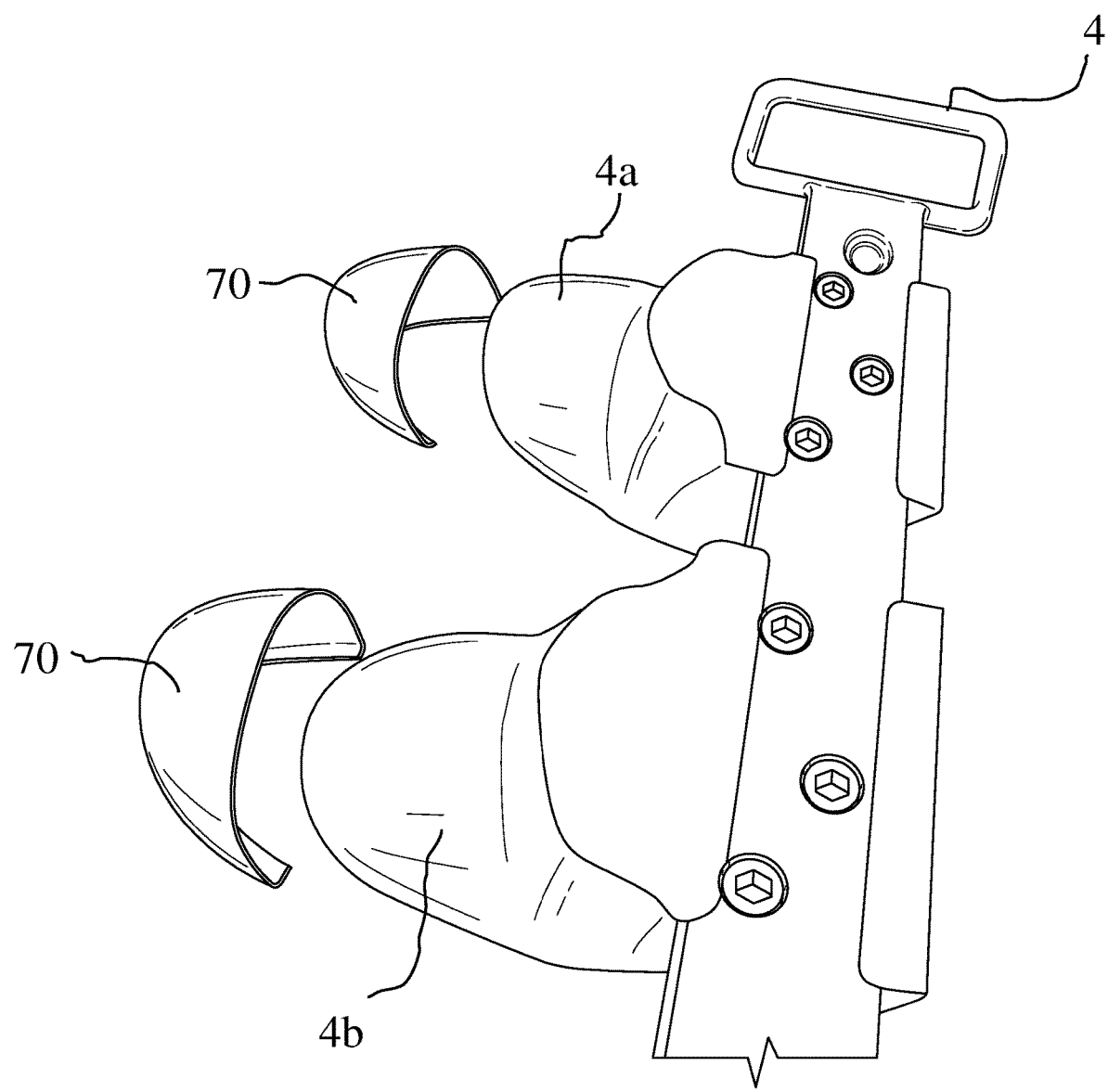
FIG. 6 depicts the toe cap lid of the mold for forming the outsole of FIG. 1.
Figure 7:
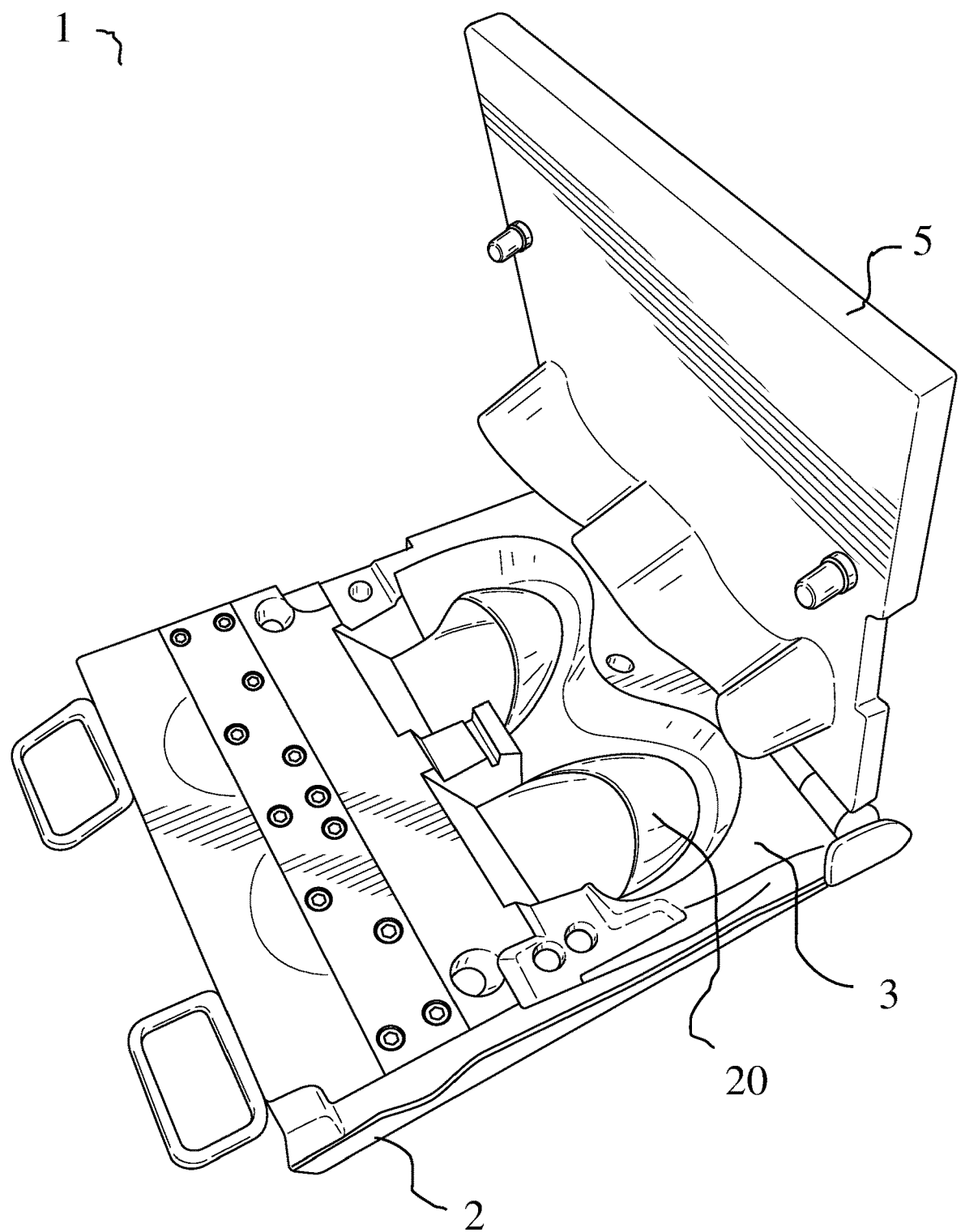
FIG. 7 depicts an open view of the mold for forming the outsole of FIG. 1.
Figure 8:
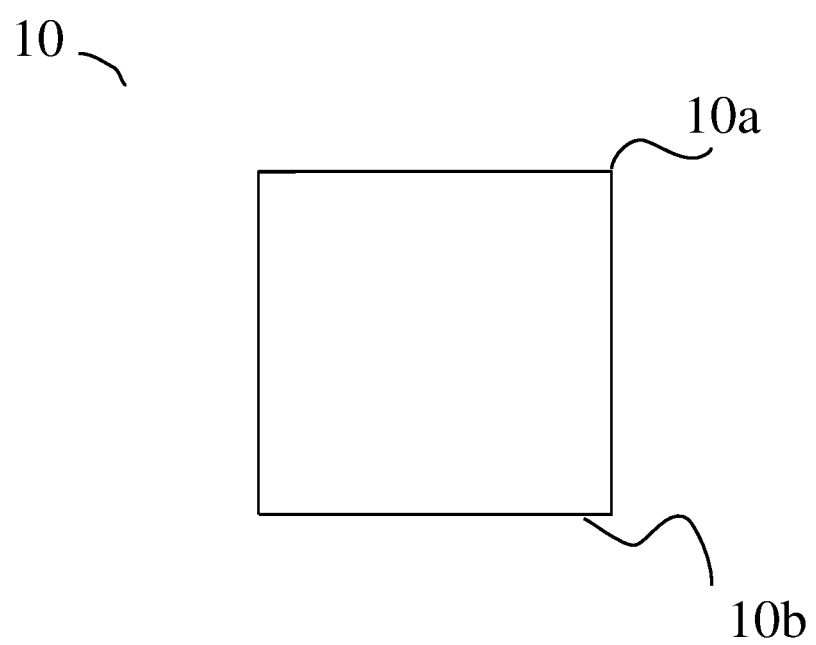
FIG. 8 depicts a raw material that forms the outsole of FIG. 1.

In one embodiment of this invention for constructing the outsole of FIG. 1, a mold (1) is provided for shaping outsole (20) as shown in FIGS. 2-7. In some embodiments the mold (1) includes a bottom lid (2) (FIG. 2) having a bottom lid cavity (2a) for shaping the bottom portion (22) of the outsole (20) during the heating process. In many embodiments the bottom lid cavity (2a) comprises a pattern which defines the pattern on the bottom portion (22) of the outsole (20). In some embodiments the mold (1) further includes a middle lid (3) having a middle projection (3a) (FIG. 2) for shaping the upper portion (21) of the outsole (20) as shown in FIG. 9. In many embodiments the middle lid projection (3a) comprises a pattern which defines the pattern on the upper portion (21) of the outsole (20). In many embodiments the patterns on the bottom lid cavity and middle lid projection are generally the same. In many embodiments these patterns give traction and flexibility to the outsole. In other embodiments the patterns are different which gives different traction patterns and flexibility along the different areas of the outsole. In many embodiments the middle lid (3) further includes a middle lid gap (3b) (FIG. 3) for receiving a toe cap lid (4). As shown in FIG. 6, in many embodiments the toe cap lid (4) comprises rounded projections (4a, 4b) for forming the bottom portion (62) of the toe cap (60) during the heating process. The toe cap lid (4), as shown in FIG. 6, is also instrumental in defining the empty space (38), shown in FIG. 14, between the upper portion (21) of the outsole (20) and the bottom portion (62) of the resulting toe cap (60) during the heating process. This empty space (38) receives the wearer's toes during use. As shown in FIG. 3, in some embodiments the mold (1) further includes a top lid (5) for shaping the top portion (61) of the toe cap (60) during the heating process, as shown in FIG. 14. In many embodiments the top lid (5) further comprises top lid cavities (5a, 5b) which encase around rounded projections (4a, 4b) and forms the top portion (61) of the toe cap (60). In one embodiment, the bottom lid (2), middle lid (3), and top lid (5) are connected at the same hinged junction (6) as shown in FIG. 3. In another embodiment, the toe cap lid (4) is not connected at the hinged junction (6) and is instead an independent piece. In another embodiment, the bottom lid (2), middle lid (3), toe cap lid (4), and top lid (5) are separate pieces. In other embodiments no middle lid (3) is provided, and top lid (5) comprises a top lid projection which presses the raw material into the bottom lid.

In some embodiments a mold (1) is provided to make outsole (20). In one embodiment as shown in FIG. 5, outsole (20) is formed by first warming the mold (1) to approximately 155 degrees Celsius; placing a first raw material (10) onto the bottom lid (2); placing the middle lid (3) onto the bottom lid (2) by rotating the middle lid (3) through the hinged junction (6) so that the raw material (10) is between the bottom (2) and middle lids (3); placing a second raw material onto the toe cap lid (4); placing the toe cap lid (4) through and within the middle lid gap (3b) by rotating the toe cap lid (4) through the hinged junction (6) ; placing the top lid (5) onto the middle lid (3) by rotating the top lid (5) through the hinged junction (6) so that the second raw material is between the toe cap lid (4) and the top lid (5); securing the mold (1) with a fastener; heating the mold (1) for approximately 800 seconds at approximately between 165 degrees Celsius and 200 degrees Celsius; cooling the mold (1) to approximately 20 degrees Celsius; opening the top lid (5); removing the toe cap lid (4); opening the middle lid (3); and removing the finished outsole (20). In another embodiment, the toe cap lid (4) is utilized by steps of sliding the toe cap lid (4) through and within the middle lid gap (3b). In embodiments where mold (1) does not have a hinge, the various lids are placed or pressed on one another, rather than rotating through the hinged junction, as described above.

In many embodiments which use the mold (1), the first raw material comprises the bottom portion of outsole (20) and the second raw material comprises the toe cap (60). In some embodiments the first and second raw materials are the same material and in others they are different. Embodiments where the raw materials are the same are useful as the manufacturer does not have to store and use multiple materials, and embodiments where the raw materials are different are useful as the different areas of the outsole (20) can have different properties or characteristics depending on the material. As an example, in some embodiments the first raw material is rubber which gives compression and absorbance on the bottom of the outsole (20) and the second raw material is a hard plastic which gives rigidity and protection to toe cap (60). In some embodiments rigid material (70) is the second raw material, and in others rigid material (70) is placed under the second raw material, as discussed in more detail below. In most embodiments where rigid material (70) is the second raw material, when the first raw material is pressed and heated it molds up and over rigid material (70) such that it encapsulates rigid material (70), as shown in FIG. 17.

In many embodiments which use the mold (1), the mold is not heated and the raw materials are pressed into shape using pressure. This beneficially reduces the number of steps and decreases the amount of time it takes to make the outsole (20), as the mold (1) does not have to be headed and subsequently cooled. In other embodiments no hinge junction (6) is provided and the various pieces are stacked on top on one another rather than hinged.

In another embodiment of this invention as shown in FIGS. 19-20, a step (104, 210) of providing a rigid, durable material (70) is included. In some embodiments, after the step of rotating the middle lid (3) onto the bottom lid (2), there is a step (104, 210) of placing a rigid material (70) onto the toe cap lid (4), followed by the step of placing the second raw material on top of the rigid material (70). In some of these embodiments, the second raw material forms the toe cap (60), and the upper portion (61) of the toe cap (60) extends over the rigid material (70) while the bottom portion (62) of the toe cap (60) extends under the rigid material (70), the upper portion (61) and bottom portion (62) further connecting at a toe cap edge (37) for wholly encapsulating the rigid material (70). As discussed above, in some embodiments a second raw material is not provided and the first raw material is pressed up from the bottom lid cavity (2a) and around the rigid material (70) as described. In other embodiments no rigid material is provided and toe cap (60) is made by the first or first and second raw materials forming around toe cap lid (4).

As shown in FIG. 20, another embodiment further includes a step (202) of shaping the bottom portion (22) of the outsole (20); shaping the top portion (21) of the outsole (20); shaping the bottom portion (62) of the toe cap (60); shaping the upper portion (61) of the toe cap (60); wherein shaping the bottom (62) and upper (61) portions of the toe cap (60) further define an empty space (38) for receiving the wearer's toes.

In another embodiment, a curing agent is added to the first and second raw materials to add rigidity and stability during the heating step. In one embodiment, the first and second raw materials are the same material. In another embodiment, the first raw material is different from the second raw material. In yet another embodiment, a third raw material is used.

Applicant has advantageously found that encapsulating the rigid material (70) between a top (61) and bottom (62) layer of the toe gap (60) greatly improves a number of attributes of the toe cap (60), such as impact protection compression, antistatic resistance, water penetration and resistance, outsole penetration resistance, heat resistance, conductive resistance, and cold and heat insulation.

In one embodiment as shown in FIGS. 16-17, each of the toe cap top layer (61) and bottom layer (62) has a width of approximately 1.0 mm to approximately 3.0 mm. In one embodiment, the top (61) and bottom (62) layer of the toe cap (60) each have a width of approximately between 1.0 mm and 1.7 mm, ideally between approximately 1.4 mm and 1.6 mm for a better ratio of protection to comfort. Applicant has advantageously found that when the top (61) and bottom (62) layers of the toe cap (60) each have a width of approximately between 1.0 mm and 1.7 mm, the toe cap (60) exhibits greatly increased properties. Specifically, the toe cap (60) can endure compressions of up to 12,000 Newtons, penetration resistance of up to 900 Newtons, heat resistance of up to 250 degrees Celsius, conductive max resistant of up to 70,000 Ohms, an anti-static range of 100,000 Ohms to 500 mega-Ohms, and improved water, cold, and heat insulation. Applicant has also advantageously found that in an embodiment wherein the top (61) and bottom (62) layers of the toe cap (60) each have a width of approximately 1.5 mm, the toe cap (60) exhibits the greatest balance between the above-mentioned properties as well as comfort and flexibility for the wearer.

In another embodiment as shown in FIGS. 16-17, the top (61) and bottom layers (62) of the toe cap (60) each have a width of approximately between 1.71 mm and 2.4 mm, ideally between approximately 1.9 mm and 2.1 mm for a better ration of protection to comfort. Applicant has advantageously found that when the top (61) and bottom (62) layers of the toe cap (60) each have a width of approximately between 1.71 mm and 2.4 mm, the toe cap (60) exhibits greatly increased properties. Specifically, the toe cap (60) can endure compressions of up to 15,000 Newtons, penetration resistance of up to 1,100 Newtons, heat resistance of up to 300 degrees Celsius, conductive max resistant of up to 100,000 Ohms, an anti-static range of 100,000 Ohms to 1,000 mega-Ohms, and greatly improved water, cold, and heat insulation. Applicant has also advantageously found that in an embodiment wherein the top (61) and bottom (62) layers of the toe cap (60) each have a width of approximately 2.0 mm, the toe cap (60) exhibits the greatest balance between the above-mentioned properties as well as comfort and flexibility for the wearer.

In another embodiment as shown in FIGS. 16-17, the top (61) and bottom layers (62) of the toe cap (60) each have a width of approximately between 2.41 mm and 3.0 mm, ideally between approximately 2.6 mm and 2.8 mm for a better ratio of protection to comfort. Applicant has advantageously found that when the top (61) and bottom layers (62) of the toe cap (60) each have a width of approximately between 2.4 mm and 3.0 mm, the toe cap (60) exhibits further greatly increased properties. Specifically, the toe cap (60) can endure compressions of up to 18,000 Newtons, penetration resistance of up to 1,300 Newtons, heat resistance of up to 350 degrees Celsius, conductive max resistant of up to 120,000 Ohms, an anti-static range of 100,000 Ohms to 1,500 mega-Ohms, and greatly improved water, cold, and heat insulation. Applicant has also advantageously found that in an embodiment wherein the top (61) and bottom layers (62) of the toe cap (60) each has a width of approximately 2.7 mm, the toe cap (60) exhibits the greatest balance between the above-mentioned properties as well as comfort and flexibility for the wearer.

The present disclosure includes that contained in the appended claims, as well as that of the foregoing description. Although this invention has been described in its form with a certain degree of particularity, it is understood that the present disclosure of the forms have been made only by way of example and that numerous changes in the details of construction and the combination and arrangement of parts may be resorted to without departing from the spirit and scope of the invention.

What is claimed:

1. A method for making an outsole comprising the steps of:
   providing a mold comprising a bottom lid, a middle lid, a toe cap lid, and a top lid;
   wherein said bottom, middle, and top lids are all connected via a hinge;
   wherein said toe cap lid fits in said middle lid gap;
   wherein said middle lid comprises a middle lid gap;
   placing a first raw material on said bottom lid;
   pressing said first raw material between said middle lid and said bottom lid;
   placing said toe cap lid within said middle lid gap;
   placing a second raw material on said toe cap lid;
   pressing said second raw material between said toe cap lid and said top lid;
   wherein said pressing of said second raw material between said toe cap lid and said top lid define the toe cap and toe region;
   placing a rigid material onto a top portion of said toe region;
   shaping said toe cap by pressing said top portion of said toe region around said rigid material;
   wherein said rigid material is integrally connected with said outsole;
   providing at least one portion with an edge;
   providing an upper surface;
   extending said at least one portion upwards and attached to said upper surface;
   wherein said toe cap further comprises a first sidewall and a second sidewall, which are spaced apart from each other;
   providing a front region of the outsole with a peripheral edge;
   securing said first sidewall and said second sidewall to said peripheral edge.

2. The method for making an outsole according to claim 1, further comprising the steps of warming said mold to approximately 155 degrees Celsius before placing said first raw material on said bottom lid.

3. The method for making an outsole according to claim 1, further comprising the step of heating said mold to between 165 to 200 degrees Celsius after pressing said second raw material between said toe cap lid and said top lid.

4. The method for making an outsole according to claim 1, wherein said second raw material selected from the group consisting of metal, wood, hard plastics, and combinations thereof.

5. The method for making an outsole according to claim 1, further comprising the step of connecting said bottom lid, middle lid, and top lid via a hinge.

6. A method for making an outsole comprising the steps of:
   providing a mold comprising a bottom lid, a middle lid, a toe cap lid, and a top lid;
   wherein said bottom, middle, and top lids are all connected via a hinge;
   wherein said middle lid comprises a middle lid gap;
   wherein said toe cap lid fits in said middle lid gap;
   warming said mold;
   placing a raw material on said bottom lid;
   pressing said raw material between said middle lid and said bottom lid;
   placing a rigid material on said toe cap lid;
   placing said toe cap lid and said rigid material into said middle lid gap;
   placing said top lid on said middle lid;
   heating said mold;
   opening said mold and removing said outsole;
   shaping the toe cap;
   wherein said toe cap comprises a top layer and a bottom layer;
   providing an outsole and a toe region;
   wherein said outsole has an upper portion;
   wherein said toe region comprises a top portion and a bottom portion;

wherein the step of shaping said toe cap further comprises the step of extending a side of said outsole upwards and generally perpendicular to said upper portion of said outsole for forming an edge and the step of extending said edge toward a heel region to form a cavity.

7. The method for making an outsole according to claim 6, wherein said bottom lid comprises an inner and outer face, and wherein said inner face comprises a bottom lid cavity where said raw material is placed.

8. The method for making an outsole according to claim 7, wherein said middle lid comprises a middle lid projection, and which further comprises the steps of creating a pattern on said outsole with a pattern on said bottom lid cavity and said middle lid projection.

9. The method for making an outsole according to claim 6, further comprising the step of encapsulating said rigid material within said raw material.

10. The method for making an outsole according to claim 6, further comprising the step of adding a second raw material on top of said rigid material.

11. The method for making an outsole according to claim 6, wherein the step of warming said mold is completed by warming said mold to approximately 155 degrees Celsius.

12. The method for making an outsole according to claim 6, wherein the step of heating said mold is completed by heating said mold to between 165 to 200 degrees Celsius for approximately 800 seconds.

13. A method for making an outsole comprising the steps of:
providing a mold comprising a bottom lid, a middle lid, a toe cap lid, and a top lid, and wherein said bottom, middle, and top lids are all connected via a hinge;
wherein said middle lid further comprises a middle lid gap and a middle lid projection;
wherein said toe cap lid fits in said middle lid gap;
warming said mold;
placing a first raw material on said bottom lid;
pressing said first raw material between said bottom and middle lids by rotating said middle lid about said hinge;
placing a rigid material on said toe cap lid;
placing said toe cap lid and said rigid material into said middle lid gap;
placing a second raw material on said rigid material;
pressing said second raw material between said toe cap lid and said top lid by rotating said top lid about said hinge;
pressing said first and second raw materials by securing said mold in a closed position;
adding a curing agent to said first raw material and said second raw material;
heating said mold;
opening said mold and removing said outsole;
wherein said outsole comprises a toe cap.

14. The method for making an outsole according to claim 13, wherein the step of warming said mold is completed by warming said mold to approximately 155 degrees Celsius.

15. The method for making an outsole according to claim 13, wherein the step of heating said mold is completed by heating said mold to between 165 to 200 degrees Celsius.

16. The method for making an outsole according to claim 15, wherein said step of heating said mold is completed for approximately 800 seconds.

17. The method for making an outsole according to claim 13, wherein said top lid further comprises a top lid cavity which mates with said toe cap lid.

18. The method for making an outsole according to claim 13, further comprising the steps of molding said first and second raw materials into a monolithic unit and encapsulating said rigid material within said monolithic unit.

19. The method for making an outsole according to claim 13, wherein said step of opening said mold and removing said outsole further comprises the steps of:
un-securing said mold;
rotating open said top lid;
removing said toe cap lid;
rotating open said middle lid;
removing said outsole.

20. The method for making an outsole according to claim 1, further comprising the steps of:
placing a third raw material with said second raw material on said toe cap lid;
pressing said third raw material with said second raw material between said toe cap lid and said top lid.

* * * * *